(12) United States Patent
Murdock

(10) Patent No.: US 8,096,056 B1
(45) Date of Patent: Jan. 17, 2012

(54) TRIM INSTALLATION SQUARE DEVICE

(76) Inventor: Randale C. Murdock, Oshweken (CA)

( * ) Notice: Subject to any disclaimer, the term of this patent is extended or adjusted under 35 U.S.C. 154(b) by 0 days.

(21) Appl. No.: 12/856,165

(22) Filed: Aug. 13, 2010

(51) Int. Cl.
*G01B 5/14* (2006.01)

(52) U.S. Cl. .............................. 33/194; 33/526; 33/562

(58) Field of Classification Search ................... 33/194, 33/197, 418, 427, 428, 429, 526, 527, 562
See application file for complete search history.

(56) References Cited

U.S. PATENT DOCUMENTS

| | | | | |
|---|---|---|---|---|
| 1,662,066 A * | 3/1928 | Krumm | ............................ | 33/428 |
| 3,183,598 A * | 5/1965 | Parr | ................................. | 33/527 |
| 5,188,013 A * | 2/1993 | Cardinale | ........................ | 33/527 |
| 5,361,508 A * | 11/1994 | Ruggiero | ......................... | 33/527 |
| D423,957 S | 5/2000 | Johnson | | |
| 6,195,904 B1 * | 3/2001 | Greer | ............................... | 33/527 |
| D445,700 S | 7/2001 | Mapston | | |
| 6,442,853 B1 | 9/2002 | Hale et al. | | |
| 6,523,272 B1 * | 2/2003 | Morales | .......................... | 33/526 |
| 6,931,735 B1 | 8/2005 | Clark et al. | | |
| 7,409,773 B1 * | 8/2008 | Gioia et al. | ...................... | 33/527 |
| 7,493,704 B2 * | 2/2009 | Bailey | .............................. | 33/526 |
| 7,849,607 B2 * | 12/2010 | Alvarez | ........................... | 33/194 |
| 2002/0053142 A1 | 5/2002 | Brunetti | | |
| 2003/0131486 A1 | 7/2003 | Wallace | | |
| 2006/0123648 A1 * | 6/2006 | Bailey | ............................. | 33/526 |
| 2007/0261256 A1 | 11/2007 | Christensen et al. | | |
| 2008/0276471 A1 | 11/2008 | Arne | | |
| 2008/0307663 A1 * | 12/2008 | Peterson | ......................... | 33/527 |
| 2010/0139106 A1 * | 6/2010 | Atwood | ........................... | 33/418 |

* cited by examiner

*Primary Examiner* — G. Bradley Bennett

(57) ABSTRACT

A trim installation square device is provided for facilitating measurement, cutting and installation of trim around a door or window opening. The device includes a base member, and extension member extendably coupled to the base member, and a locking assembly for holding the base member and extension member in place. The base member and the extension member are positioned relative to each other such that a base member first edge is parallel to an extension member first edge and a base member second edge is parallel to an extension member second edge forming two spaced right angles. A ruler is coupled to one of the base member and the extension member. The ruler is positioned for measuring a transverse distance between the base member first edge and the extension member first edge.

14 Claims, 3 Drawing Sheets

TRIM INSTALLATION SQUARE DEVICE

BACKGROUND OF THE DISCLOSURE

Field of the Disclosure

The disclosure relates to squaring tools and more particularly pertains to a new squaring tool for facilitating measurement, cutting and installation of trim around a door or window opening.

SUMMARY OF THE DISCLOSURE

An embodiment of the disclosure meets the needs presented above by generally comprising a base member having a base member first edge and a base member second edge. The base member first edge is positioned at a right angle relative to the base member second edge. An extension member has an extension member first edge and an extension member second edge. The extension member first edge is at a right angle relative to the extension member second edge. The extension member is extendably coupled to the base member. The base member and the extension member are positioned relative to each other such that the base member first edge is parallel to the extension member first edge and the base member second edge is parallel to the extension member second edge. A locking assembly is coupled to the base member and the extension member for selectively locking the extension member into a static position relative to the base member. A ruler is coupled to one of the base member and the extension member. The ruler is positioned for measuring a transverse distance between the base member first edge and the extension member first edge.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
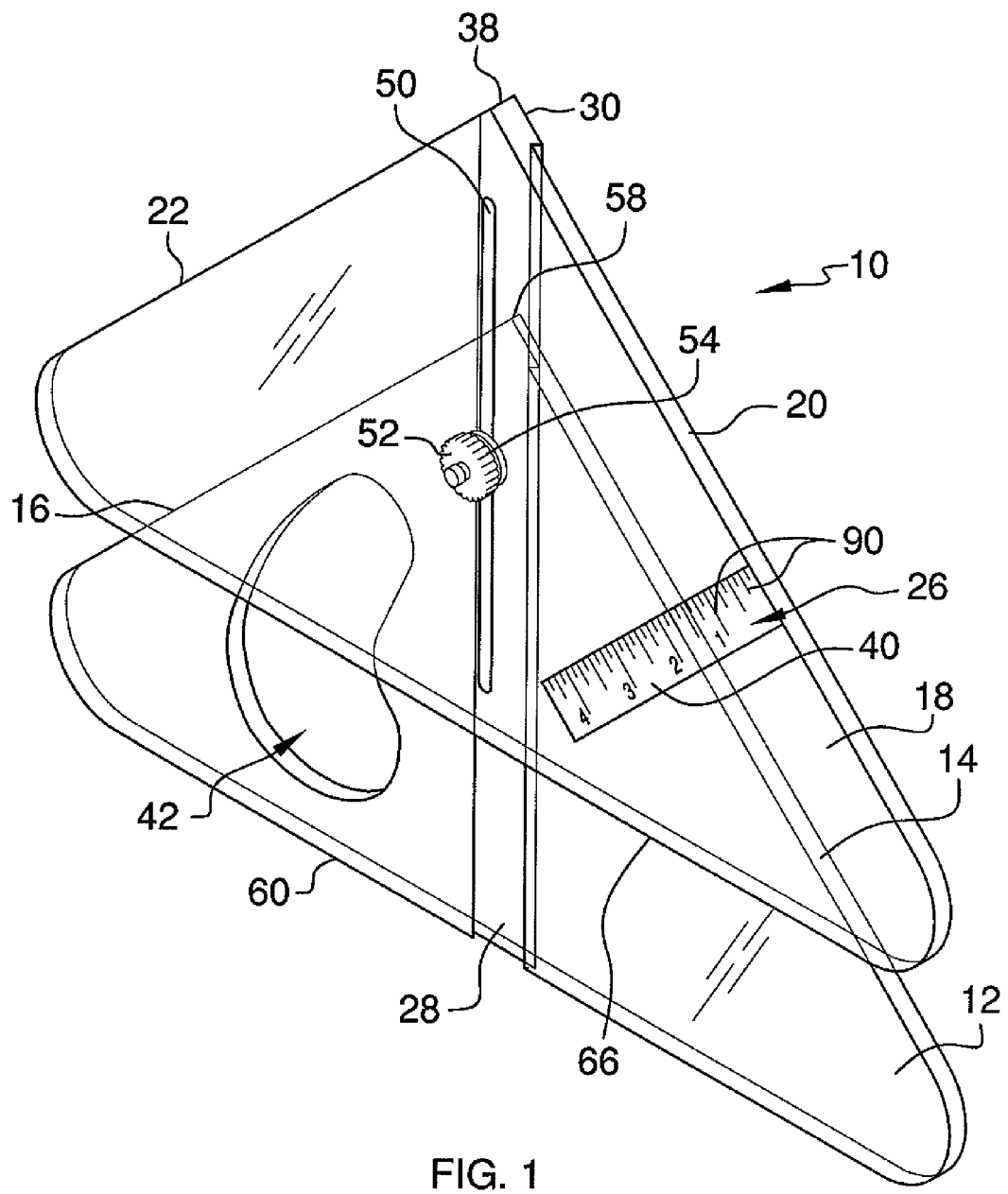
FIG. 1 is a front top side perspective view of a trim installation square device according to an embodiment of the disclosure.
Figure 2:
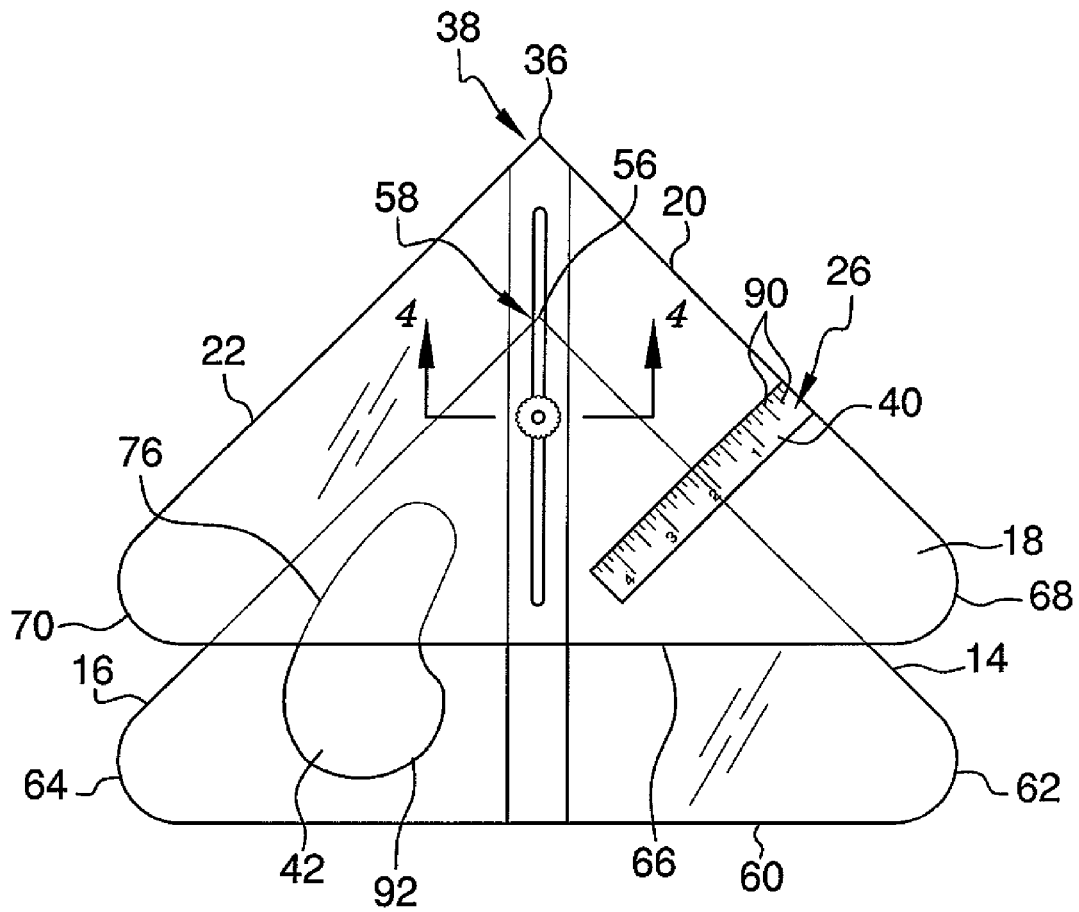
FIG. 2 is a front view of an embodiment of the disclosure.
Figure 3:
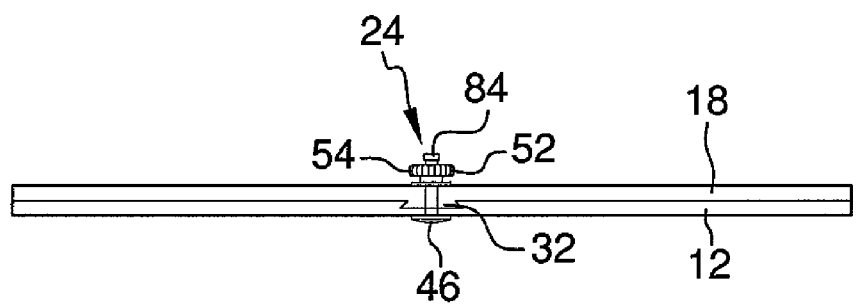
FIG. 3 is a bottom view of an embodiment of the disclosure.
Figure 4:
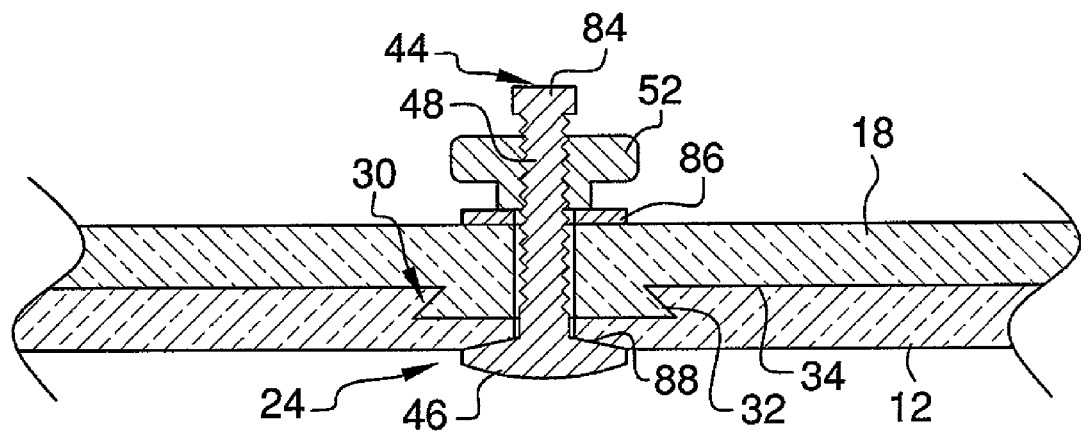
FIG. 4 is a cross-sectional view of an embodiment of the disclosure taken along line 4-4 of FIG. 2.
Figure 5:
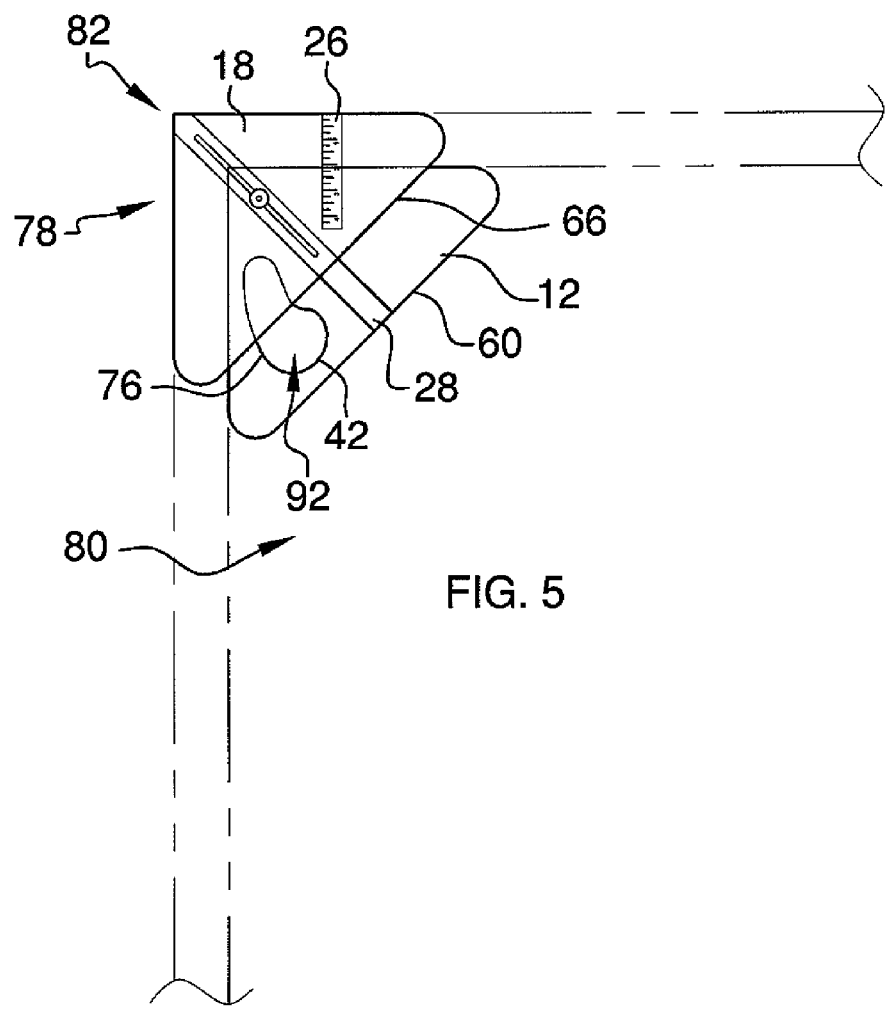
FIG. 5 is a front view of an embodiment of the disclosure in use.

With reference now to the drawings, and in particular to FIGS. 1 through 5 thereof, a new squaring tool embodying the principles and concepts of an embodiment of the disclosure and generally designated by the reference numeral 10 will be described.

As best illustrated in FIGS. 1 through 5, the trim installation square device 10 generally comprises a base member 12 having a base member first edge 14 and a base member second edge 16. The base member first edge 14 is positioned at a right angle relative to the base member second edge 16. An extension member 18 has an extension member first edge 20 and an extension member second edge 22. The extension member first edge 20 is at a right angle relative to the extension member second edge 22. The extension member 18 is extendably coupled to the base member 12. The base member 12 and the extension member 18 are positioned relative to each other such that the base member first edge 14 is parallel to the extension member first edge 20 and the base member second edge 16 is parallel to the extension member second edge 22. A locking assembly 24 is coupled to the base member 12 and the extension member 18 for selectively locking the extension member 18 into a static position relative to the base member 12. A ruler 26 is coupled to one of the base member 12 and the extension member 18. The ruler 26 is positioned for measuring a transverse distance between the base member first edge 14 and the extension member first edge 20.

To maintain the desired orientation between the base member 12 and the extension member 18, the base member 12 may have a groove portion 28. The extension member 18 has a tongue portion 30 complimentary to the groove portion 28. The tongue portion 30 is slidably positioned into the groove portion 28. The groove portion 28 is positioned such that a distance between the base member first edge 14 and the extension member first edge 20 is equal to a distance between the base member second edge 16 and the extension member second edge 22. Further, the groove portion 28 extends in a straight line such that the distance between the base member first edge 14 and the extension member first edge 20 remains equal to the distance between the base member second edge 16 and the extension member second edge 22 as the tongue portion 30 slides in the groove portion 28. The tongue portion 28 may have a trapezoidal transverse cross-sectional shape 32 such that the tongue portion 28 flares outwardly extending away from a face 34 of the extension member 18.

The extension member 18 includes an extension member point 36 positioned at an intersection 38 between the extension member first edge 20 and the extension member second edge 22. The extension member 18 may be fully transparent but is minimally transparent adjacent to the ruler 26 such that the base member first edge 14 is visible through the extension member 18 adjacent to the ruler 26. The ruler 26 may also be defined by spaced markings 90 on a transparent section 40 of said extension member 18 such that said base member first edge 14 is visible through said ruler 26.

The locking assembly 24 includes a screw 44 having a head portion 46 and a threaded portion 48 extending from the head portion 46. The threaded portion 48 passes through the base member 12 and an elongated slot 50 in the extension member 18. The locking assembly 24 further includes a locking nut 52 threadably coupled to the threaded portion 48. Thus, the base member 12 and the extension member 18 are compressible between the head portion 46 and the locking nut 52 for frictionally locking the base member 12 and the extension member 18 together. The locking nut 52 may have a knurled circumferential edge 54 to facilitate manipulation of the locking nut 52. The threaded portion 46 may have an unthreaded end portion 84 for preventing the screw 44 from accidentally disengaging from the locking nut 52. A washer 86 may also be employed to facilitate frictional engagement of the extension member 18 between the locking nut 52 and the head portion 46. The head portion 46 may also be tapered extending outwardly from the threaded portion 46. The base member 12 includes a complimentary angled surface 88 such that the head portion 46 is at least partially recessed into the base member 12.

The base member 12 may include a base member point 56 positioned at an intersection 58 between the base member first edge 14 and the base member second edge 16. A base member third edge 60 extends between the base member first edge 14 and the base member second edge 16. A base member first rounded corner portion 62 is positioned between the base member first edge 14 and the base member third edge 60. Similarly, a base member second rounded corner portion 64 is positioned between the base member second edge 16 and the base member third edge 60.

An extension member third edge 66 extends between the extension member first edge 20 and the extension member second edge 22. An extension member first rounded corner portion 68 is positioned between the extension member first edge 20 and the extension member third edge 66. An extension member second rounded corner portion 70 is positioned between the extension member second edge 22 and the extension member third edge 66.

A gripping aperture 42 may be positioned in the base member 12 for facilitating manipulation of the base member 12. The gripping aperture 42 may be generally kidney-shaped with a bulbous end 92 positioned proximate the base member third edge 60 and a curved outer edge 76 positioned proximate the base member second edge 16.

The device 10 may be produced in metal or plastic and has a height between 7.75 inches and 8.25 inches and a width between 12 inches and 14 inches. The device 10 may be scaled up or down in size to accommodate various applications.

In use, the base member 12 is positionable with the base member first edge 14 and the base member second edge 16 abutting a corner section 78 of an opening 80 such as a window or door to confirm the corner section 78 is square. The extension member 18 may be adjusted relative to the base member 12 to a desired reveal and trim width as indicated by the ruler 26. The desired reveal and trim width is locked into place using the locking assembly 24. When the base member 12 is positioned in the corner section 78 and the corner section 78 is confirmed to be square, the extension member point 36 will be positioned at an intersection 82 of outer edges of trim pieces corresponding to the selected reveal and trim width indicated by the ruler 26. This intersection 82 may be marked to facilitate accurate measurement for cutting and installation of trim pieces around the opening 80.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A trim installation square device comprising:
    a base member having a base member first edge and a base member second edge, said base member first edge being at a right angle relative to said base member second edge;
    an extension member having an extension member first edge and an extension member second edge, said extension member first edge being at a right angle relative to said extension member second edge;
    said extension member being extendably coupled to said base member;
    wherein said base member and said extension member are positioned such that said base member first edge is parallel to said extension member first edge and said base member second edge is parallel to said extension member second edge;
    a locking assembly coupled to said base member and said extension member for selectively locking said extension member into a static position relative to said base member; and
    a ruler coupled to one of said base member and said extension member, said ruler being positioned for measuring a transverse distance between said base member first edge and said extension member first edge.

2. The trim installation square device of claim 1, further comprising:
    said base member having a groove portion; and
    said extension member having a tongue portion complimentary to said groove portion, said tongue portion being slidably inserted into said groove portion.

3. The trim installation square device of claim 2, wherein said groove portion is positioned such that a distance between said base member first edge and said extension member first edge is equal to a distance between said base member second edge and said extension member second edge.

4. The trim installation square device of claim 1, wherein said extension member includes an extension member point positioned at an intersection between said extension member first edge and said extension member second edge.

5. The trim installation square device of claim 1, wherein said extension member is transparent adjacent to said ruler such that said base member first edge is visible through said extension member adjacent to said ruler.

6. The trim installation square device of claim 1, further including a gripping aperture positioned in said base member for facilitating manipulation of said base member.

7. The trim installation square device of claim 1, further comprising:
    wherein said locking assembly includes a screw having a head portion and a threaded portion extending from said head portion, said threaded portion passing through said base member and said extension member; and
    wherein said locking assembly further includes a locking nut threadably coupled to said threaded portion whereby said base member and said extension member are compressible between said head portion and said locking nut for frictionally locking said base member and said extension member together.

8. The trim installation square device of claim 7, further including said extension member having an elongated slot, said threaded portion of said screw passing through said elongated slot.

9. The trim installation square device of claim 1, wherein said base member includes a base member point positioned at an intersection between said base member first edge and said base member second edge.

10. The trim installation square device of claim 4, further comprising:
- an extension member third edge extending between said extension member first edge and said extension member second edge;
- an extension member first rounded corner portion positioned between said extension member first edge and said extension member third edge; and
- and an extension member second rounded corner portion positioned between said extension member second edge and said extension member third edge.

11. The trim installation square device of claim 9, further comprising:
- a base member third edge extending between said base member first edge and said base member second edge;
- a base member first rounded corner portion positioned between said base member first edge and said base member third edge; and
- and a base member second rounded corner portion positioned between said base member second edge and said base member third edge.

12. The trim installation square device of claim 2, wherein said tongue portion has a trapezoidal transverse cross-sectional shape such that said tongue portion flares outwardly extending away from a face of said extension member.

13. The trim installation square device of claim 6, wherein said gripping aperture is positioned proximate said base member second edge.

14. A trim installation square device comprising:
- a base member having a base member first edge and a base member second edge, said base member first edge being at a right angle relative to said base member second edge;
- an extension member having an extension member first edge and an extension member second edge, said extension member first edge being at a right angle relative to said extension member second edge;
- said extension member being extendably coupled to said base member;
- wherein said base member and said extension member are positioned such that said base member first edge is parallel to said extension member first edge and said base member second edge is parallel to said extension member second edge;
- a locking assembly coupled to said base member and said extension member for selectively locking said extension member into a static position relative to said base member;
- a ruler coupled to one of said base member and said extension member, said ruler being positioned for measuring a transverse distance between said base member first edge and said extension member first edge;
- said base member having a groove portion;
- said extension member having a tongue portion complimentary to said groove portion, said tongue portion being slidably inserted into said groove portion;
- wherein said groove portion is positioned such that a distance between said base member first edge and said extension member first edge is equal to a distance between said base member second edge and said extension member second edge;
- wherein said extension member includes an extension member point positioned at an intersection between said extension member first edge and said extension member second edge;
- wherein said extension member is transparent adjacent to said ruler such that said base member first edge is visible through said extension member adjacent to said ruler;
- a gripping aperture positioned in said base member for facilitating manipulation of said base member;
- wherein said locking assembly includes a screw having a head portion and a threaded portion extending from said head portion, said threaded portion passing through said base member and said extension member;
- wherein said locking assembly further includes a locking nut threadably coupled to said threaded portion whereby said base member and said extension member are compressible between said head portion and said locking nut for frictionally locking said base member and said extension member together;
- said extension member having an elongated slot, said threaded portion of said screw passing through said elongated slot;
- wherein said base member includes a base member point positioned at an intersection between said base member first edge and said base member second edge;
- an extension member third edge extending between said extension member first edge and said extension member second edge;
- an extension member first rounded corner portion positioned between said extension member first edge and said extension member third edge;
- and an extension member second rounded corner portion positioned between said extension member second edge and said extension member third edge;
- a base member third edge extending between said base member first edge and said base member second edge;
- a base member first rounded corner portion positioned between said base member first edge and said base member third edge;
- and a base member second rounded corner portion positioned between said base member second edge and said base member third edge;
- wherein said tongue portion has a trapezoidal transverse cross-sectional shape such that said tongue portion flares outwardly extending away from a face of said extension member; and
- wherein said gripping aperture is positioned proximate said base member second edge.

* * * * *